United States Patent
Bott et al.

(10) Patent No.: US 9,505,558 B2
(45) Date of Patent: Nov. 29, 2016

(54) OSCILLATING CONVEYOR

(71) Applicant: Afag Holding AG, Hergiswil (CH)

(72) Inventors: Klaus Bott, Altdorf (DE); Izudin Mesan, Nürnberg (DE); Sebastian Mojrzisch, Hannover (DE); Jens Twiefel, Hannover (DE); Jörg Wallascheck, Hannover (DE)

(73) Assignee: AFAG HOLDING AG, Hergiswil (CH)

( * ) Notice: Subject to any disclaimer, the term of this patent is extended or adjusted under 35 U.S.C. 154(b) by 0 days.

(21) Appl. No.: 14/789,096

(22) Filed: Jul. 1, 2015

(65) Prior Publication Data
US 2016/0001980 A1    Jan. 7, 2016

(30) Foreign Application Priority Data
Jul. 3, 2014   (DE) .................. 10 2014 109 314

(51) Int. Cl.
| | |
|---|---|
| B65G 27/00 | (2006.01) |
| B65G 27/16 | (2006.01) |
| B65G 27/04 | (2006.01) |
| B06B 3/00 | (2006.01) |
| B65G 27/24 | (2006.01) |

(52) U.S. Cl.
CPC ............. *B65G 27/16* (2013.01); *B06B 3/00* (2013.01); *B65G 27/00* (2013.01); *B65G 27/04* (2013.01); *B65G 27/24* (2013.01)

(58) Field of Classification Search
CPC ....... B65G 27/00; B65G 27/04; B65G 27/16
USPC ............................................. 198/752.1, 630
See application file for complete search history.

(56) References Cited

U.S. PATENT DOCUMENTS

| | | |
|---|---|---|
| 5,810,155 A | 9/1998 | Hashimoto et al. |
| 6,455,982 B1* | 9/2002 | Hashimoto .......... B65G 35/005 310/328 |

(Continued)

FOREIGN PATENT DOCUMENTS

| | | |
|---|---|---|
| DE | 4216050 A1 | 11/1993 |
| DE | 4328750 C1 | 12/1994 |

(Continued)

OTHER PUBLICATIONS

European Search Report for corresponding EP Application No. 15169409, dated Nov. 15, 2015.

(Continued)

*Primary Examiner* — William R Harp
(74) *Attorney, Agent, or Firm* — Lucas & Mercanti, LLP

(57) ABSTRACT

An oscillating conveyor including an oscillating rail, on which goods can be conveyed in the direction of a first position on the oscillating rail by oscillation of the oscillating rail, and also including at least one excitation element for exciting the oscillation. The excitation element is an ultrasonic transducer which is coupled to the oscillating rail at the first position and via which the oscillating rail can be excited into oscillating at the first position in dependence on a control signal supplied by a control device. The oscillating conveyor has at least one damping element and/or the oscillating rail itself is formed from an oscillation-damping material so that the oscillation amplitude decreases along the oscillating rail as the distance from the first position increases.

21 Claims, 2 Drawing Sheets

(56) References Cited

U.S. PATENT DOCUMENTS

| | | | | |
|---|---|---|---|---|
| 6,575,669 B2* | 6/2003 | Takasan | ............ | G10K 15/00 198/630 |
| 6,609,609 B2* | 8/2003 | Takasan | ............ | B65G 54/00 198/630 |
| 6,637,585 B2* | 10/2003 | Takasan | ............ | B65G 54/00 198/630 |
| 6,779,650 B2* | 8/2004 | Takasan | ............ | B65G 27/00 198/630 |
| 6,802,220 B2* | 10/2004 | Takasan | ............ | B06B 1/0238 198/630 |
| 6,994,207 B2* | 2/2006 | Takasan | ............ | H04R 17/00 198/630 |
| 7,870,946 B2* | 1/2011 | Zimmermann | ....... | B65G 54/02 181/0.5 |
| 8,118,156 B2* | 2/2012 | Kondoh | ............ | B01L 3/50273 198/619 |
| 9,114,940 B2* | 8/2015 | Kraegeloh | ............ | A63F 3/00 |
| 2003/0081798 A1 | 5/2003 | Takasan | | |
| 2011/0272884 A1* | 11/2011 | Kraegeloh | ............ | A63F 3/00 273/237 |

FOREIGN PATENT DOCUMENTS

| | | |
|---|---|---|
| DE | 1002012211103 | 1/2014 |
| JP | S61-124412 A | 6/1986 |

OTHER PUBLICATIONS

Office Action from corresponding Canadian Patent Application No. 2,896,044 dated May 30, 2016; 5 pages.

* cited by examiner

OSCILLATING CONVEYOR

CROSS-REFERENCE TO RELATED APPLICATIONS

The present application claims priority of DE 10 2014 109 314.3, filed Jul. 3, 2014, the priority of this application is hereby claimed and this application is incorporated herein by reference.

BACKGROUND OF THE INVENTION

The invention relates to an oscillating conveyor comprising an oscillating rail, on which goods can be conveyed in the direction of a first position on the oscillating rail by oscillation of the oscillating rail, and also comprising at least one excitation element for exciting the oscillation.

Oscillating conveyors are used, inter alia, for feeding small components or the like in automated production processes. The material which is to be conveyed is conveyed along a predefined path by ellipsoidal vibratory movement. In order to generate the vibratory movement, use can be made of electromagnetic oscillation generators operating preferably at the supply frequency of 50 Hz or 60 Hz. The electromagnetic oscillation generators may have a rectifying property, as a result of which the oscillation frequency of the oscillating conveyor is around 100 Hz or 120 Hz and thus being in an acoustic range which is audible to humans. A low oscillation frequency, on the one hand, thus results in environmental noise pollution. On the other hand, in many application cases, strong vibrations are undesired since they can disrupt neighboring processes. Electromagnetic oscillation generators, on account of their functional principle, also generate electromagnetic radiation, which can disrupt adjacent devices or processes.

Instead of electromagnetic oscillation generators, it is also possible to use other actuators, for example piezo actuators, in order to make a rigid rail oscillate. Just replacing the oscillation generator, however, means that, with the same oscillation amplitude, the noise pollution is comparable.

SUMMARY OF THE INVENTION

It is therefore an object of the present invention to specify an oscillating conveyor which is improved in relation to the prior art in respect of noise pollution during operation and which nevertheless allows high conveying rates.

The object is achieved according to the invention by an oscillating conveyor of the type mentioned in the introduction, wherein the excitation element is an ultrasonic transducer which is coupled to the oscillating rail at the first position and via which the oscillating rail can be excited into oscillating at the first position in dependence on a control signal supplied by a control device, wherein the oscillating conveyor comprises at least one damping element and/or the oscillating rail itself is formed from an oscillation-damping material, so that the oscillation amplitude decreases along the oscillating rail as the distance from the first position increases.

The invention thus proposes to excite the oscillating rail at a high frequency at a first position to which goods are to be conveyed and, at the same time, to design the oscillating conveyor such that the oscillation is damped along the oscillating rail and thus decreases along the oscillating rail starting from the first position. It is therefore the case that, rather than the entire oscillating rail being made to oscillate elliptically, deformation oscillations of the oscillating rail are excited. The high-frequency excitation excites in particular surface oscillations of the oscillating rail. The damping of the oscillation prevents the formation of standing waves on the oscillating rail. The excitation forms a travelling wave which runs along the oscillating rail and starts from the first position. As a result of such a travelling wave, goods are conveyed on the oscillating rail counter to the direction of propagation of the travelling wave, that is to say in the direction of the first position.

The oscillations are excited, in the oscillating conveyor according to the invention, by ultrasonic transducers which convert alternating voltages or alternating currents into mechanical oscillations. The oscillation frequency may be greater than 10 kHz, in particular greater than 20 kHz. Oscillation of the oscillating rail can be excited by virtue of the ultrasonic transducer being coupled to the oscillating rail over the entire width of the oscillating rail. As an alternative, it is also possible for the ultrasonic transducer to be coupled to the oscillating rail only in an in particular central sub-region of the oscillating rail. This results in a component of the goods-conveying direction being directed toward the center of the rail and therefore in stabilization of the goods on the oscillating rail. The ultrasonic transducer can be coupled directly to the oscillating rail, but it is also possible for an additional coupling element to be provided between the ultrasonic transducer and the oscillating rail.

The oscillating rail itself may be formed from an oscillation-damping material. In this case, the oscillating rail may be formed from a material with a high level of internal friction, for example a plastics material or an elastomer. In particular if use is made of long oscillating rails, however, it may be advantageous to use an oscillating rail which itself has only a low level of oscillation damping. Such an oscillating rail may be formed, for example, from glass, metal or ceramic material.

The oscillating rail may be designed in the form of an elongate panel. It is also possible, however, for the conveying surface of the oscillating rail, goods being conveyed on said conveying surface, to be of concave form, for example to be in the form of a cut-away polygon, of a cut-away circle or of a cut-away ellipse.

The ultrasonic transducer may comprise an, in particular prestressed, multilayer piezo actuator. Piezo actuators are particularly suitable for giving rise, even at relatively low voltages, to a large amount of displacement travel and/or large forces. The forces can be increased further by virtue of the piezo actuator being prestressed, that is to say for example by virtue of the layers of the piezo actuator being arranged in a housing such that the piezo actuator is already compressed. Such a housing may be formed, for example, from ceramic material or metal.

The piezo actuator may be arranged, in particular, between the oscillating rail and a counterweight. The counterweight can be connected to the oscillating rail exclusively via the piezo actuator, or the housing of a prestressed piezo actuator, and can otherwise swing freely. In particular in the case of the piezo actuator operating at a resonant frequency of the system made up of the piezo actuator, counterweight and in particular a coupling element, it is possible, even with small activating-signal amplitudes, to achieve large oscillation amplitudes.

The piezo actuator, or a coupling element fixed to the piezo actuator, may be adhesively bonded and/or screwed and/or connected in a form-fitting manner to the oscillating rail. On the one hand, a stable coupling between the piezo actuator and the oscillating rail is important in order to achieve optimal coupling of the oscillation into the oscillating rail. On the other hand, it is possible for the ultrasonic transducer to be retained in the oscillating conveyor according to the invention, with the exception of wires for feeding the control signal, exclusively by the oscillating rail.

The damping element may be a further ultrasonic transducer coupled to the oscillating rail at a second position. Using a further ultrasonic transducer as the damping element provides numerous advantages. For example, changing over the control signals of the further ultrasonic transducer and of the ultrasonic transducer makes it possible to change the conveying direction of the goods. Using at least two ultrasonic transducers, at least one serving as the damping element, it additionally makes it possible to adapt the damping strength in a flexible manner. Using a separate damping element means that it is possible, in particular, to use long oscillating rails made of a material which provides only a low level of oscillation damping.

It is possible to design the control device to feed to the further ultrasonic transducer a further control signal having a predetermined phase position in relation to the control signal of the ultrasonic transducer. The further control signal may be selected, in particular, such that it corresponds essentially to a phase shift through 180° of an oscillation introduced from the first position. The amplitude of the further control signal controls the degree of damping of the oscillation.

As an alternative, it is possible for the further ultrasonic transducer to be assigned a further control device, which is designed to detect oscillations of the further ultrasonic transducer and to supply a further control signal for the further ultrasonic transducer in dependence on the oscillations detected. If use is made, for example, of an ultrasonic transducer based on a piezo actuator, then a voltage which is dependent on the current oscillating position of the oscillating rails at the second position drops across the piezo actuator on account of the oscillation of the oscillating rail at the second position and the coupling of this oscillation into the piezo actuator. Monitoring of said voltage makes it possible to detect an oscillation amplitude and an oscillation phase at the second position, and the second control device can generate a signal to compensate for this oscillation. It is possible here, in order to detect the oscillation, for the activation of the further ultrasonic transducer to be interrupted temporarily, but it is also possible for the oscillation to be monitored during operation of the second ultrasonic transducer for damping the oscillations at the second position.

It is also possible to use more than two ultrasonic transducers in oscillating conveyors according to the invention. For example it is possible to arrange, along the oscillating rail, first of all a first ultrasonic transducer at the first position, a second ultrasonic transducer at a second position, spaced apart from the first, and a third ultrasonic transducer at a third position, spaced apart from the second. Depending on which of the ultrasonic transducers is operated with damping action and which is operated to generate a travelling wave, goods can be transported in a flexible manner between the three positions. If, for example, transportation from the first to the third position is to take place, then the first ultrasonic transducer is operated for generating an oscillation and the third ultrasonic transducer is operated for damping this oscillation. In this case, the second ultrasonic transducer oscillates along purely passively, since its piezo elements are not activated, and transportation takes place from the first position to the third position. If, in contrast, the first and third ultrasonic transducers are activated for generating a travelling wave and the second ultrasonic transducer is operated with damping action, then goods move from the second position, depending on their precise location, in the direction of the first position or of the third position, and this can be used, for example, in order to separate components. Further activation options and the use of more than three excitation elements along the oscillating rail are obvious to a person skilled in the art from the explanation up to this point and will not be described in detail.

The control device may be designed, in particular, for supplying to the ultrasonic transducer a control signal at the resonant frequency of the ultrasonic transducer. The resonant frequency may be regarded as being the resonant frequency of the oscillating system made up of the counterweight and piezo actuator and in particular the coupling element. As mentioned in the introduction, excitation frequencies used in the case of the oscillating conveyor according to the invention can excite, primarily, surface waves of the oscillating rail, as a result of which the oscillating rail as a whole may be regarded more or less as being fixed in location. Correspondingly, the oscillation may be regarded as being an oscillation of the counterweight and of the piezo actuator in relation to a fixed-location panel.

The resonant frequency at which the excitation by the control device is to take place may be predetermined as a fixed value in the control device. However, it is possible for the control device to measure the resonant frequency of the ultrasonic transducer. This can take place outside normal conveying operation, for example each time the oscillating conveyor is started or at maintenance intervals. The resonant frequency, however, may also be adjusted during operation. In order to determine the resonant frequency, it is possible to evaluate, in particular, the phase position of a control voltage and of a flowing current.

The oscillating conveyor according to the invention may have provided in it a lateral boundary, which runs parallel to the conveying direction of the oscillating rail and bounds a conveying surface of the oscillating rail at least on one side, wherein the boundary is designed in the form of a separate component which is fastened on the oscillating rail at least at two points and/or is in frictional contact with the oscillating rail. In particular it is possible to use a damping material for the boundary. If the boundary is fastened on the oscillating rail at at least two points, then, in the case of the oscillating rail being subjected to bending oscillation, it is also the case that the boundary is deformed. If the latter is formed from oscillation-damping material, then it withdraws energy from the oscillation of the oscillating rail, as a result of which the oscillation of the oscillating rail is damped. Even when the boundary is in frictional contact with the oscillating rail, the oscillating rail is damped by the boundary. The boundary serves both to ensure that goods cannot leave the oscillating rail laterally and as a damping element.

As an alternative, or in addition, the oscillating conveyor according to the invention may also have other damping elements. For example it is possible for an oscillation-damping material, that is to say for example a layer of rubber or some other elastomer, to be fitted laterally or on a base side of the rail over the entire length of the rail or in certain regions. It is also the case that other friction-based damping methods are possible. For example, the oscillating rail may be mounted at one or more points such that a slight frictional movement of the oscillating rail in relation to the mounting is possible. This can take place, for example, by engagement around the oscillating rail, for example by a tensioned belt. A corresponding belt or a holder may also be guided through an aperture in the oscillating rail.

The oscillating rail may advantageously be formed from a transparent material. For example, the oscillating rail may be formed from glass, a transparent ceramic material or a transparent plastics material. This is advantageous, in particular, when the conveyed goods are to be detected by a detection device, for example a camera. In this case, the oscillating rail may be illuminated from beneath, in order to facilitate detection of the conveyed objects. It is, of course, also possible for the conveyed objects to be detected from the side which is directed away from the conveying surface of the oscillating rail. If use is made of a transparent oscillating rail, it is also possible to use light barriers or the like, which pass through the oscillating rail, in order to monitor a goods-conveying operation.

The ultrasonic transducer may be arranged on the oscillating rail such that, when the control signal is fed to the ultrasonic transducer, the surface of the oscillating rail is deflected perpendicularly to a, or the, conveying surface of the oscillating rail in dependence on the control signal. As an alternative, it would be possible, for example, to arrange the ultrasonic transducer such that it couples into the oscillating rail oscillations from a lateral edge of the oscillating rail.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
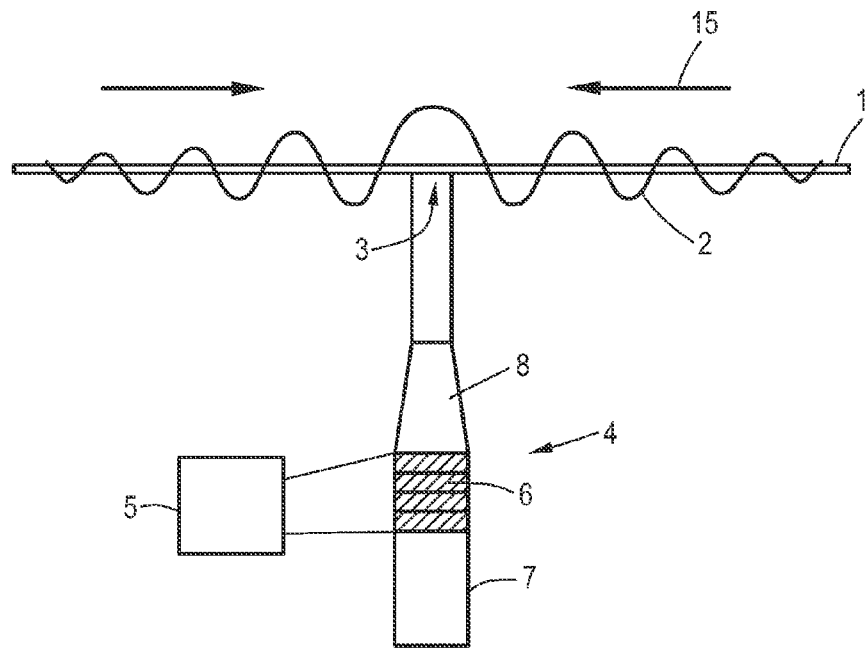
FIG. 1 shows an exemplary embodiment of an oscillating conveyor according to the invention.

FIG. 1 shows an exemplary embodiment of an oscillating conveyor which comprises an oscillating rail 1 on which goods can be conveyed, by an oscillation indicated by the line 2, in the direction of a position 3, said direction being indicated in each case by the arrows 15. The oscillation of the oscillating rail 1 is generated by virtue of the oscillating rail 1 being excited at the position 3 by an excitation element 4, which is designed in the form of an ultrasonic transducer.

The oscillating rail 1 is designed for damping action, that is to say from an elastomer with a relatively high level of internal friction. This means that the amplitude of the oscillation indicated by the line 2 decreases along the oscillating rail as the distance from the first position 3 increases. The oscillation forms a travelling wave which, starting from the position 3, propagates along the oscillating rail 1 in both directions counter to the direction indicated by the arrow 15. A high excitation frequency, which is greater than 10 kHz, means that it is primarily the surface of the oscillating rail 1 that oscillates. This oscillation of the surface of the oscillating rail 1 in the form of a travelling wave causes goods which are positioned on the oscillating rail 1 at a distance apart from the position 3 to be conveyed in the direction of the position 3 counter to the direction of the travelling wave.

The ultrasonic transducer comprises a multilayer piezo actuator 6, which is prestressed by a housing (not shown) made of ceramic material. The multilayer piezo actuator 6 is excited into oscillating by virtue of the control device 5 emitting an in particular sinusoidal control voltage. The piezo actuator 6 is connected to the oscillating rail 1 via a coupling element 8. The coupling element, on the side of the piezo actuator, is adhesively bonded to the piezo actuator 6 and, on the side of the oscillating rail 1, is screwed to the oscillating rail 1. In alternative embodiments of the oscillating conveyor, it would be possible for the coupling element 8 or the piezo actuator 6 itself to be adhesively bonded and/or screwed and/or connected in form-fitting manner to the oscillating rail 1.

The coupling element 8 extends, on the oscillating-rail side, essentially over the entire width of the oscillating rail 1, as seen in the direction perpendicular to the image plane. The oscillating rail is thus excited homogenously over its entire width. As an alternative, it would be possible for the coupling element 8 to extend over a section of smaller width than the width of the oscillating rail 1. In particular when the region of the coupling between the excitation element 4 and the oscillating rail 1 is arranged essentially centrally in relation to the width of the rail at the position 3, a conveying operation with a movement component in the width wise direction towards the center of the rail is achieved, and this stabilizes goods on the oscillating rail.

The excitation element 4 is oscillated in relation to a counterweight 7, which is coupled exclusively to the piezo actuator 6 and otherwise swings freely. The control device 5 excites the ultrasonic transducer by applying to the piezo actuator 6 a voltage at a resonant frequency of the ultrasonic transducer, that is to say essentially at the resonant frequency of the oscillating system made up of the piezo actuator 6 and counterweight 7. The resonant frequency can be determined automatically by the control device 5, for example by a phase position between the control-signal voltage emitted and the flow of current being detected and evaluated. As an alternative, it would be possible to emit a pulse-like control signal and then to monitor the voltage progression on the piezo actuator. A person skilled in the art can also infer further options for determining a resonant frequency of the ultrasonic transducer. As an alternative, or in order to limit the search range for the resonant frequency, it is also possible for a resonant frequency of the ultrasonic transducer to be predetermined in the control device 5.

The oscillating rail 1 is formed from a transparent material, for example a transparent plastics material. This makes it possible for the movement of the goods to be monitored by sensors arranged beneath the oscillating rail 1. As an alternative, or in addition, it is also possible for the oscillating rail 1 to be illuminated by light sources arranged beneath the oscillating rail 1, that is to say on the excitation-element side. Optical sensors above the oscillating rail 1 can detect goods particularly easily in this case as a result of the light source being blotted out.

Figure 2:
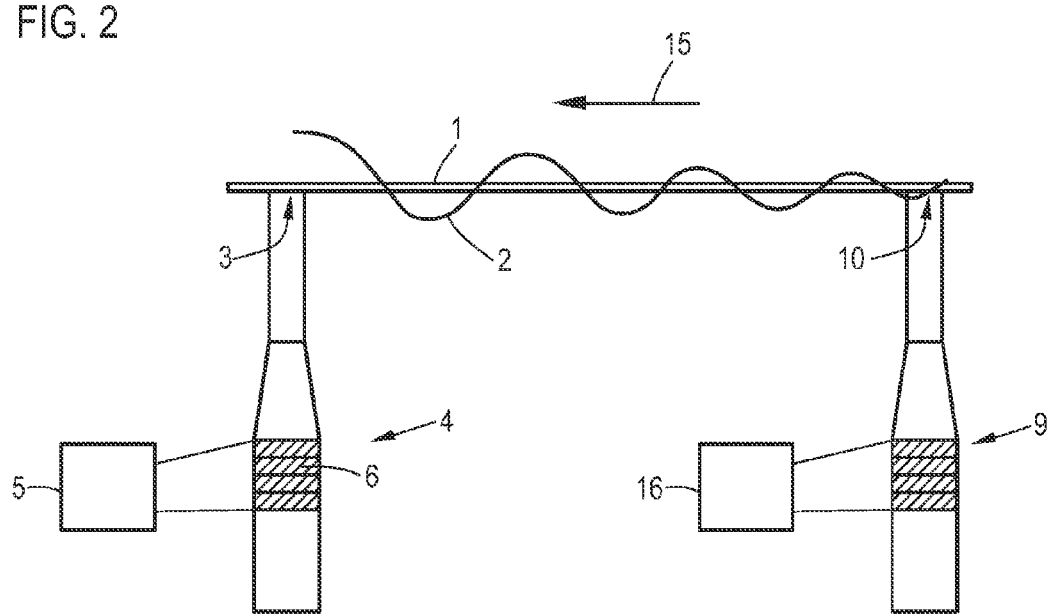
FIG. 2 shows a further exemplary embodiment of an oscillating conveyor according to the invention.

FIG. 2 shows a further embodiment of an oscillating conveyor for conveying goods in the direction of a first position 3 by virtue of the oscillating rail 1 oscillating as indicated by the line 2. In contrast to the exemplary embodiment according to FIG. 1, the material used for the oscillating rail 1 here is a material which provides only a low level of damping for the oscillations of the oscillating rail 1.

The material is transparent, for example glass or a transparent ceramic material. As an alternative, it is also possible for the material used for the oscillating rail 1 to be a metal.

As explained in relation to FIG. 1, the transportation principle of the oscillating conveyor is based on goods being moved counter to the direction of propagation of a travelling wave indicated by the line 2, that is to say in the direction of the arrow 15. In order to establish a travelling wave in a material with weak damping properties, the additional damping element 9, designed in the form of a further ultrasonic transducer, is provided. The damping element 9 is coupled to the oscillating rail 1 at the second position 10.

The construction of the damping element 9, that is to say the second ultrasonic transducer, corresponds to the construction of the excitation element 4, that is to say to the first ultrasonic transducer. The differences between the excitation element 4 and the damping element 9 are a result of the activation of the damping element 9 by the further control device 16 being different from the activation of the excitation element 4 by the control device 5. A damping operation of the second ultrasonic transducer is achieved in that voltages induced by oscillations of the oscillating rail 1 at the position 10 are detected by the second control device 16 at a piezo actuator of the damping element 9 and, in dependence thereof, said second control device determines, and emits, a control signal for the piezo actuator. Since the oscillations at position 10 are periodic oscillations, it is possible, by way of relatively straightforward, for example PLL-based, circuits, to supply a control signal which, when fed to the piezo actuator of the damping element 9, at least partially compensates for the oscillation of the oscillating rail 1 at the position 10.

In alternative embodiments of the oscillating conveyor, use can be made of a common control device in order to supply both a control signal for the excitation element 4 and a further control signal for the damping element 9. In particular, a control signal emitted as the further control signal for the damping element 9 may be one which corresponds, in respect of the frequency composition, to the control signal for the excitation element 4, wherein the phase position and the amplitude of said signal are adapted in order to be emitted to the damping element 9.

The phase position of the control signal for the damping element 9 is selected such that the control signal is phase shifted through 180° in relation to an oscillation generated on account of the control signal of the excitation element 4, and introduced via the oscillating rail 1 from the position 3, and therefore, if an appropriate amplitude is selected, said control signal fully or partially cancels out said oscillation.

According to a further alternative, it is, of course, also possible to use separate control devices for activation the excitation element 4 and the damping element 9, wherein synchronization of the control devices achieves a fixed phase position between the control signals.

The phase position between control signal can be predetermined as a fixed value in the one control device or in the two control devices, but can also be established by tests, for example by predetermining a control signal for the excitation element 4 and measuring the resulting oscillations at the second position 10, for example by measuring the voltage at the piezo actuator of the damping element 9.

In relation to the exemplary embodiment which is shown in FIG. 1, using an essentially non-damping oscillating rail 1 and an additional damping element 9 is advantageous since, on the one hand, it is possible to use even very long oscillating rails 1 if a separate damping element is provided at the second position 10. On the other hand, it is also possible, solely by changing the respective control signals, for the second ultrasonic transducer to be operated as an excitation element and for the first ultrasonic transducer to be operated as a damping element. It is thus also possible, solely by changing over the control signals supplied by the control devices 5, 16, for the oscillating conveyor to convey the goods in the direction counter to the arrow 15. The oscillating conveyor thus allows bidirectional transportation of goods.

Figure 3:
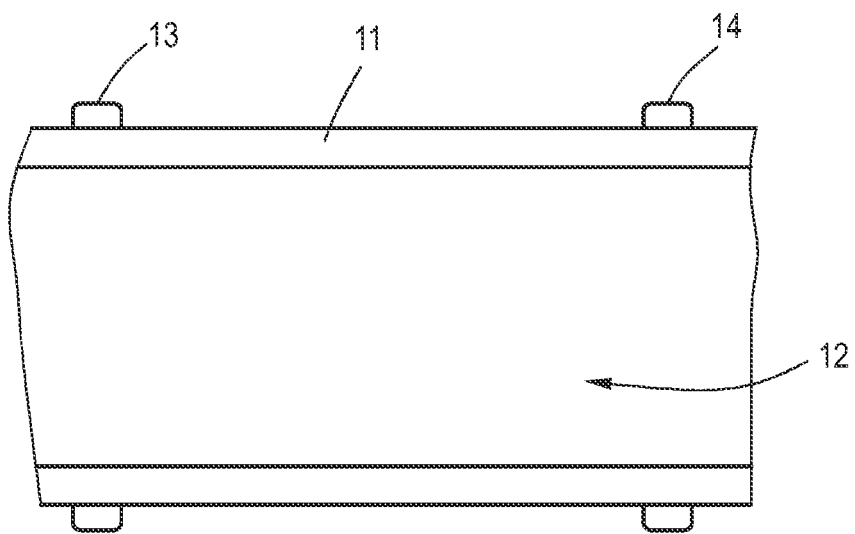
FIG. 3 shows the oscillating rail of a third exemplary embodiment of an oscillating conveyor according to the invention.
Figure 4:
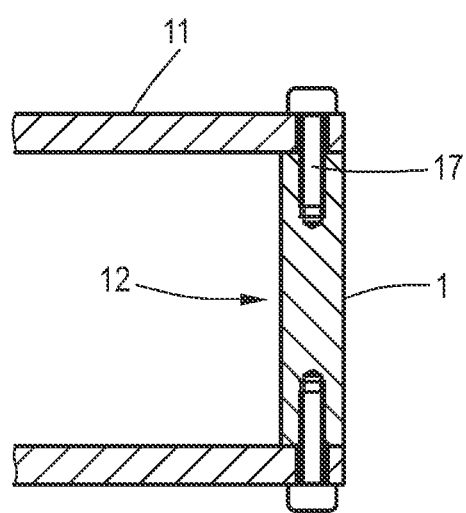
FIG. 4 shows a sectional view of the oscillating rail shown in FIG. 3.

FIGS. 3 and 4 show an oscillating rail 1 of a third exemplary embodiment of an oscillating conveyor for conveying goods, wherein the oscillating rail 1 has arranged on it a boundary 11, which is screwed to the oscillating rail 1, using screws 17 at two points 13, 14. The conveying surface 12 of the oscillating rail 1 is bounded laterally as a result of the boundary 11 being provided, and therefore goods cannot leave the oscillating rail 1 laterally.

The boundary 11, in addition, performs the function of an additional damping element. Since the boundary 11 is connected to the oscillating rail 1 only at the points 13, 14, the oscillating rail 1 can be moved in relation to the boundary 11 in the region between the points 13 and 14. In this region, however, the boundary 11 is in frictional contact with the oscillating rail 1. Energy is therefore transmitted from the oscillating rail 1 to the boundary 11 and the oscillation of the oscillating rail 1 is damped.

As an alternative, it would be possible for the oscillating rail to be damped by a boundary which is connected to the oscillating rail 1 along the entire length of the boundary, for example by virtue of a boundary made of an elastic material with a relatively high level of internal friction being adhesively bonded to the oscillating rail 1.

In a further alternative, which is not shown, it would be possible for the oscillating rail 1 to be formed such that the conveying surface 12 is concave. For example, the conveying surface 12 could be in the form of a semicircle, or a half-ellipse or of a cut-away polygon.

In addition, or as an alternative, to using damping elements which are fastened on the oscillating rail 1 and additionally form a boundary 11, it would also be possible, in order to damp the oscillating rail, for elastic materials with a high level of internal friction to be fastened on that side of the oscillating rail 1 which is directed away from the conveying surface 12. A further option for damping the oscillating rail would be to mount the oscillating rail in an essentially form-fitting manner in at least one position, it being possible for the oscillating rail 1 to move with a small amount of friction in relation to the mounting. For example it is possible for the oscillating rail 1 to be retained, at a point at which it is to be damped, by a tensioning belt or the like.

While specific embodiments of the invention have been shown and described in detail to illustrate the inventive principles, it will be understood that the invention may be embodied otherwise without departing from such principles.

We claim:

1. An oscillating conveyor comprising an oscillating rail, on which goods can be conveyed in the direction of a first position on the oscillating rail by oscillation of the oscillating rail, and also comprising at least one excitation element for exciting the oscillation, wherein the excitation element is an ultrasonic transducer which is coupled to the oscillating rail at the first position and via which the oscillating rail can be excited into oscillating at the first position in dependence on a control signal supplied by a control device, wherein the oscillating rail itself is formed from an oscillation-damping material, so that the oscillation amplitude decreases along the oscillating rail as the distance from the first position increases, and the oscillating conveyor further comprising a damping element including a further ultrasonic transducer coupled to the oscillating rail at a second position, wherein the control device is designed to feed to the further ultrasonic transducer a further control signal having a predetermined phase position in relation to the control signal of the ultrasonic transducer.

2. The oscillating conveyor according to claim 1, wherein the ultrasonic transducer comprises an, in particular, prestressed, multilayer piezo actuator.

3. The oscillating conveyor according to claim 2, wherein the piezo actuator is arranged between the oscillating rail and a counterweight.

4. The oscillating conveyor according to claim 2, wherein the piezo actuator, or a coupling element fixed to the piezo actuator, is adhesively bonded and/or screwed and/or connected in a form-fitting manner to the oscillating rail.

5. The oscillating conveyor according to claim 1, wherein the control device is designed for supplying to the ultrasonic transducer a control signal at the resonant frequency of the ultrasonic transducer.

6. The oscillating conveyor according to claim 1, wherein the oscillating rail is formed from a transparent material.

7. The oscillating conveyor according to claim 1, wherein the ultrasonic transducer is arranged on the oscillating rail such that, when the control signal is fed to the ultrasonic transducer, the surface of the oscillating rail is deflected perpendicularly to a, or the, conveying surface of the oscillating rail in dependence on the control signal.

8. An oscillating conveyor comprising an oscillating rail, on which goods can be conveyed in the direction of a first position on the oscillating rail by oscillation of the oscillating rail, and at least one excitation element for exciting the oscillation, wherein the excitation element is an ultrasonic transducer which is coupled to the oscillating rail at the first position and via which the oscillating rail can be excited into oscillating at the first position in dependence on a control signal supplied by a control device, and wherein the oscillating conveyor comprises at least one damping element, so that the oscillation amplitude decreases along the oscillating rail as the distance from the first position increases, the at least one damping element including a lateral border, which runs parallel to a conveying direction of the oscillating rail and bounds a conveying surface of the oscillating rail at least one side, wherein the boundary is designed in the form of a separate component which is fastened on the oscillating rail at at least two points and/or is in frictional contact with the oscillating rail.

9. The oscillating conveyor according to claim 8, wherein the ultrasonic transducer comprises an, in particular, prestressed, multilayer piezo actuator.

10. The oscillating conveyor according to claim 9, wherein the piezo actuator is arranged between the oscillating rail and a counterweight.

11. The oscillating conveyor according to claim 9, wherein the piezo actuator, or a coupling element fixed to the piezo actuator, is adhesively bonded and/or screwed and/or connected in a form-fitting manner to the oscillating rail.

12. The oscillating conveyor according to claim 8, wherein the control device is designed for supplying to the ultrasonic transducer a control signal at the resonant frequency of the ultrasonic transducer.

13. The oscillating conveyor according to claim 8, wherein the oscillating rail is formed from a transparent material.

14. The oscillating conveyor according to claim 8, wherein the ultrasonic transducer is arranged on the oscillating rail such that, when the control signal is fed to the ultrasonic transducer, the surface of the oscillating rail is deflected perpendicularly to a, or the, conveying surface of the oscillating rail in dependence on the control signal.

15. An oscillating conveyor comprising an oscillating rail, on which goods can be conveyed in the direction of a first position on the oscillating rail by oscillation of the oscillating rail, and also comprising at least one excitation element for exciting the oscillation, wherein the excitation element is an ultrasonic transducer which is coupled to the oscillating rail at the first position and via which the oscillating rail can be excited into oscillating at the first position in dependence on a control signal supplied by a control device, wherein the oscillating rail itself is formed from an oscillation-damping material, so that the oscillation amplitude decreases along the oscillating rail as the distance from the first position increases, and the oscillating conveyor further comprising a damping element including a further ultrasonic transducer coupled to the oscillating rail at a second position, wherein the further ultrasonic transducer is assigned a further control device, which is designed to detect oscillations of the further ultrasonic transducer and to supply a further control signal for the further ultrasonic transducer in dependence on the oscillations detected.

16. The oscillating conveyor according to claim 15, wherein the ultrasonic transducer comprises an, in particular, prestressed, multilayer piezo actuator.

17. The oscillating conveyor according to claim 16, wherein the piezo actuator is arranged between the oscillating rail and a counterweight.

18. The oscillating conveyor according to claim 16, wherein the piezo actuator, or a coupling element fixed to the piezo actuator, is adhesively bonded and/or screwed and/or connected in a form-fitting manner to the oscillating rail.

19. The oscillating conveyor according to claim 15, wherein the control device is designed for supplying to the ultrasonic transducer a control signal at the resonant frequency of the ultrasonic transducer.

20. The oscillating conveyor according to claim 15, wherein the oscillating rail is formed from a transparent material.

21. The oscillating conveyor according to claim 15, wherein the ultrasonic transducer is arranged on the oscillating rail such that, when the control signal is fed to the ultrasonic transducer, the surface of the oscillating rail is deflected perpendicularly to a, or the, conveying surface of the oscillating rail in dependence on the control signal.

* * * * *